United States Patent [19]
Groten et al.

[11] Patent Number: 5,730,843
[45] Date of Patent: Mar. 24, 1998

[54] CATALYTIC DISTILLATION STRUCTURE

[75] Inventors: Willibrord A. Groten; Derwyn Booker; Clifford S. Crossland, all of Pasadena, Tex.

[73] Assignee: Chemical Research & Licensing Company, Pasadena, Tex.

[21] Appl. No.: 580,822

[22] Filed: Dec. 29, 1995

[51] Int. Cl.$^6$ ..................................... B01D 3/14
[52] U.S. Cl. ..................... 202/158; 422/191; 422/193; 422/197; 422/221
[58] Field of Search ................... 422/191, 193, 422/195, 197, 221; 202/158; 203/DIG. 6

[56] References Cited

U.S. PATENT DOCUMENTS

| | | | |
|---|---|---|---|
| 2,877,099 | 3/1959 | Bowles | 422/195 |
| 3,506,408 | 4/1970 | Kageyama et al. | 23/288 |
| 3,595,626 | 7/1971 | Sowards | 422/195 |
| 3,787,188 | 1/1974 | Lyon | 23/288 R |
| 3,819,334 | 6/1974 | Yoshida et al. | 23/288 F |
| 3,882,015 | 5/1975 | Carson | 208/169 |
| 3,889,464 | 6/1975 | Gardner | 60/286 |
| 3,907,511 | 9/1975 | Forbes et al. | 23/288 G |
| 3,909,208 | 9/1975 | Boret et al. | 23/288 R |
| 3,959,183 | 5/1976 | Gospodar | 252/477 R |
| 3,963,433 | 6/1976 | Dörr et al. | 23/288 R |
| 4,154,705 | 5/1979 | Baldi et al. | 252/466 PT |
| 4,203,906 | 5/1980 | Takada et al. | 260/346.4 |
| 4,215,011 | 7/1980 | Smith, Jr. | 252/426 |
| 4,225,562 | 9/1980 | Anderson | 422/195 |
| 4,248,832 | 2/1981 | Aiken et al. | 422/191 |
| 4,383,941 | 5/1983 | Inaba et al. | 252/477 R |
| 4,397,772 | 8/1983 | Noakes et al. | 252/477 R |
| 4,420,462 | 12/1983 | Clyde | 422/201 |
| 4,439,350 | 3/1984 | Jones, Jr. | 502/527 |
| 4,443,559 | 4/1984 | Smith, Jr. | 502/527 |
| 4,731,229 | 3/1988 | Sperandio | 422/188 |
| 5,057,468 | 10/1991 | Adams | 502/1 |
| 5,073,236 | 12/1991 | Gelbein et al. | 203/29 |
| 5,189,001 | 2/1993 | Johnson | 502/159 |
| 5,262,012 | 11/1993 | Smith, Jr. | 202/158 |
| 5,266,546 | 11/1993 | Hearn | 502/300 |
| 5,348,710 | 9/1994 | Johnson et al. | 422/211 |
| 5,417,938 | 5/1995 | Shelden et al. | 422/196 |
| 5,431,890 | 7/1995 | Crossland et al. | 422/211 |

FOREIGN PATENT DOCUMENTS

| | | |
|---|---|---|
| 0448884 | 10/1991 | European Pat. Off. . |
| 0559511 | 9/1993 | European Pat. Off. . |

*Primary Examiner*—Timothy McMahon
*Attorney, Agent, or Firm*—Kenneth H. Johnson

[57] ABSTRACT

A contact structure, useful as a distillation structure, has a rigid frame made of two substantially vertical duplicate grids spaced apart and held rigid by a plurality of substantially horizontal rigid members and a plurality of substantially horizontal wire mesh tubes mounted to the grids to form a plurality of fluid pathways among the tubes. For use as a catalytic distillation structure, which serves as both the distillation structure and the catalyst, at least a portion of the wire mesh tubes contain a particulate catalytic material. The catalyst within the tubes provides a reaction zone where catalytic reactions may occur and the wire mesh provides mass transfer surfaces to effect a fractional distillation. The spacing elements provide for a variation of the catalyst density and loading and structural integrity.

21 Claims, 5 Drawing Sheets

CATALYTIC DISTILLATION STRUCTURE

BACKGROUND OF THE INVENTION

1. Field of the Invention

The invention relates generally to a distillation structure that may perform the dual function of reaction catalyst and mass transfer surface for distillation. More particularly, the invention relates to a fixed distillation structure which contains a solid particulate catalyst.

2. Related Art

The concurrent reaction and separation of products from reactants has been practiced for some time, and the advantages have been recognized. Examples of the use of concurrent reaction and distillation are disclosed in U.S. Pat. Nos.:(etherification) 4,232,177; 4,307,254; 4,336,407; 4,504,687; 4,918,243; and 4,978,807; (dimerization) 4,242,530; (hydration) 4,982,022; (dissociation) 4,447,668; and (aromatic alkylation) 4,950,834 and 5,019,669.

Several different catalytic distillation structures have been proposed. See for example U.S. Pat. Nos. 4,302,356 and 4,443,559 in which a particulate catalyst is contained within the pockets on a cloth belt wound with demister wire to form a catalytic distillation structure and U.S. Pat. No. 4,731,229 which discloses a packing with corrugated elements and tape to form a catalyst member. High efficiency packing has been modified to contain catalyst as disclosed in U.S. Pat. No. 5,073,236. It is an advantage of the present invention that greater mobility of fluids within the columns can be obtained in some of the embodiments. It is a further advantage that the catalytic distillation structure offers better distillation characteristics than many of those of the prior art.

SUMMARY OF THE INVENTION

The present invention provides a versatile contact structure comprising a rigid frame comprised of at least two substantially vertical duplicate grids, a plurality of substantially horizontal rigid members spacing and holding the grids apart and a plurality of substantially horizontal fluid permeable, preferably wire mesh, tubes mounted to said grids to form a plurality of fluid pathways among said tubes. Preferably at least a portion of said wire mesh tubes contain a particulate catalytic material. These structures may be used in any fixed bed system where fluids (liquids and/or gases) are to contact a catalytic material. The present invention is especially useful for reactive distillation, i.e., catalytic distillation processes, although the structures are also useful for liquid/liquid, gas/liquid or gas/gas concurrent or countercurrent flow.

The grids may have openings into which the rigid members, e.g. stainless steel rods or tubes and the wire mesh tubes are inserted. The grids are substantially perpendicular to the rigid members and wire mesh tubes and preferably the patterns on the grids are the same. Preferably the pattern on the grids is a regular array of openings. Sufficient of the rigid members are included in the structure to give it structural integrity such that the structures can be stacked several deep in a column. Generally the rigid members will be spaced about the periphery of the structure and rigidly attached to the grids, for example by welding.

To form the pathway among the wire mesh tubes, the structure preferably comprises at least two wire mesh tubes arrayed in a substantially parallel, adjacent and vertically aligned row and at least one offset wire mesh tube disposed adjacent to and spaced from said vertically aligned wire mesh tubes. In a more preferred embodiment the distance between the vertically aligned tubes of the columns is sufficient to allow the offset wire mesh tube to overlap the vertically aligned wire mesh tubes without contacting said vertically aligned wire mesh tubes to thereby form a tortuous fluid pathway.

The term "tube" as used herein means enclosed elongated structure of any cross section, for example, round, square or rectangular.

The structures which do not contain particulate material exhibit the advanced characteristic as described and are excellent structures for conventional distillations, where they may be used alone or in conjunction with conventional trays, downcomers, etc.

DESCRIPTION OF THE PREFERRED EMBODIMENTS

For a detailed description of the preferred embodiments the reader is referred to the attached figures in which like components are given like numerals for ease of reference.

Figure 1:
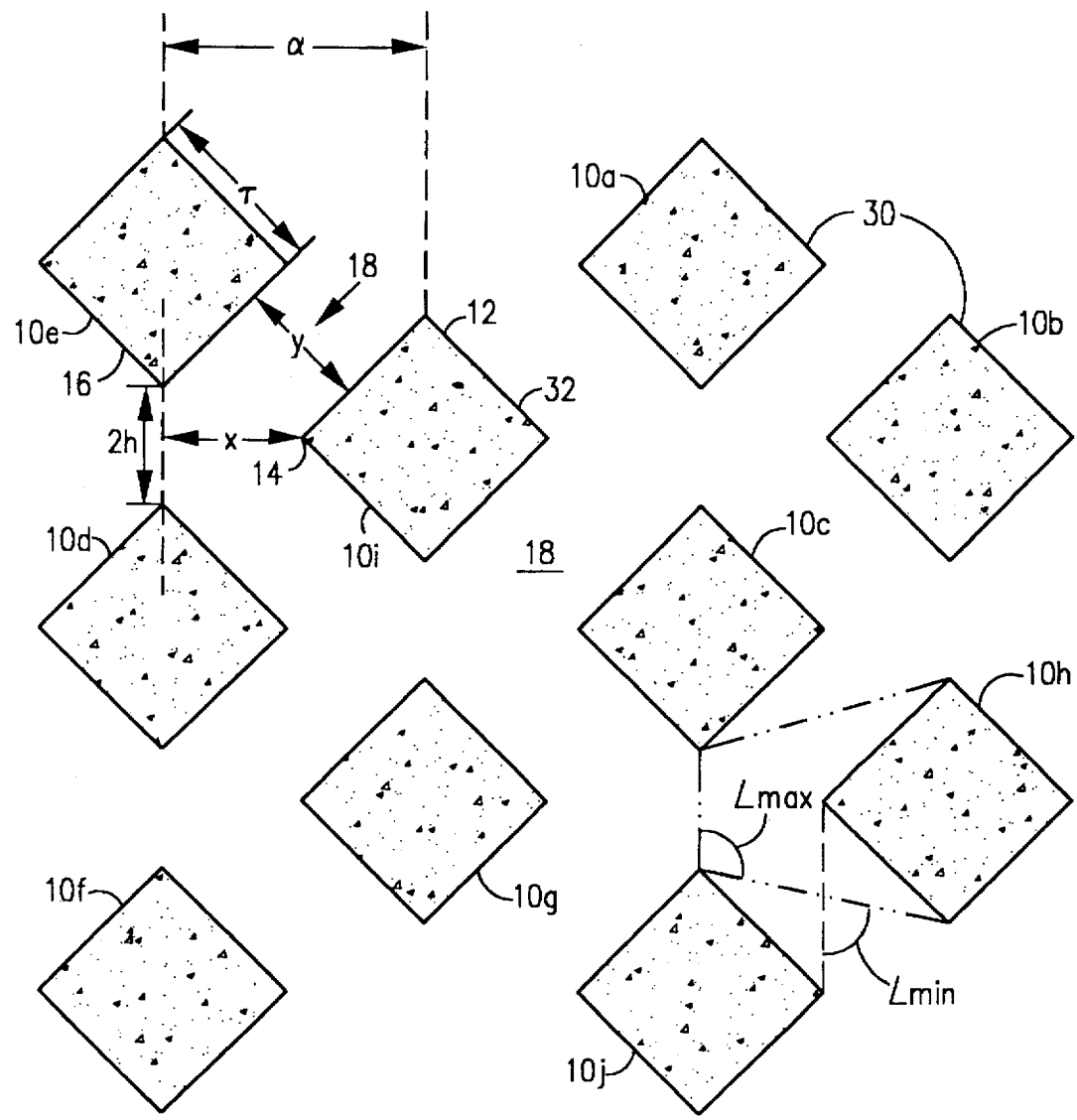
FIG. 1 is a schematic cross section of a structure showing catalyst containing elements and spatial relationship of a preferred embodiment.

FIG. 1 shows a schematic view of one embodiment where the distance between adjacent vertically positioned tubes 10 is 2h. In this embodiment x, the distance between the nearest point 14 of a laterally adjacent tube 12 and the central vertical axis 16 of the column of tubes 10 is equal to y, the distance between the laterally adjacent tubes 10 and 12 (x=y). The structure of FIG. 1 is spatially arranged such that the tubes of adjacent rows are offset to allow a portion of the tubes in each column to overlap but not touch. The overlapping provides a tortuous pathway 18 for fluids, thereby providing more opportunity for contact of the fluids with the tubes of the structure.

The catalyst 30 is contained in rectangular tubes 10a–10h of dimension τ and inerts 32 are contained in a tube 10i, while tube 10j is empty. The fraction of open area for vapor and liquid flow at the tightest constriction in the packing is given by the ratio (x−δ)/d. At the highest catalyst density for a given inter plate distance, d, the distance y equals x. If lower catalyst densities are desired, the intra tube spacing parameter, h, can be increased. Consequently, y becomes larger than x. Alternatively catalyst density can be reduced by the inert packing or empty tubes. Thus, by combinations of structural configuration and tube loading the present contact structures provide a highly adaptable means to contact fluids of great diversity. The two dotted lines on the right hand side of the figure represent the minimum (L min) and maximum (L max) free paths for flow through the packing. The arithmetic average of these paths represents the tortuosity of the packing.

The embodiment of FIG. 1 minimizes the hydraulic load on the packing required to maintain good liquid-catalyst contacting and provides very short contact time between the liquid and catalyst before vapor-liquid exchange occurs. These two factors were chosen to provide a more efficient utilization for the catalyst over a range of hydraulic loadings below the flood point and over a wide range of operating conditions such as reflux ratio. The packing was also designed to give a low HETP in order to provide greater driving force for equilibrium limited systems.

The geometry of the system of FIG. 1, when x=y, yields the following relationships:

$$h = (\sqrt{2} - 1)x \qquad 1)$$

$$d = \frac{\tau}{\sqrt{2}} + x \qquad 2)$$

$$\epsilon = \frac{(x - 2\delta)}{d} \qquad 3)$$

$$T_L = \frac{L}{(\sqrt{2}\,\tau + 2h)} \qquad 4)$$

$$P_D = \frac{D - (x + \sqrt{2}\,\tau)}{d} + 1 \qquad 5)$$

$$P_M = \frac{T_L P_D \tau^2}{DL} P_b \qquad 6)$$

$$L_{MIN} = \frac{\sqrt{(d-2x)^2 + \left(\frac{\tau}{\sqrt{2}} + h\right)^2}}{\left(\frac{\tau}{\sqrt{2}} + h\right)} \qquad 7)$$

$$L_{MAX} = \frac{2h + \sqrt{d^2 + \left(\frac{1}{\sqrt{2}} - h\right)^2}}{\left(\frac{1}{\sqrt{2}} + h\right)} \qquad 8)$$

$$Q = \frac{L_{MAX} + L_{MIN}}{2} \qquad 9)$$

$$S_M = 2\,T_L P_D \frac{(\tau + h)}{LD} \qquad 10)$$

where h=intra tube spacing parameter;

d=inter plate spacing distance (center to center);

x=minimum inter plate spacing;

τ=tube size;

ε=open void for flow at smallest constriction in packing;

$T_L$=the number of tubes per plate in a packing bundle of height L;

$P_D$=the number of plates in a packing bundle of width D;

$P_M$=catalyst density of packing;

$P_b$=catalyst bulk density;

$L_{MIN}$=minimum vapor path length per unit packing height;

$L_{MAX}$=maximum vapor path length per unit packing height;

Q=tortuosity factor;

L=height of packing bundle;

D=width of packing bundle;

$S_M$=area of screening required per unit volume of packing;

δ=wire diameter

Figure 4:
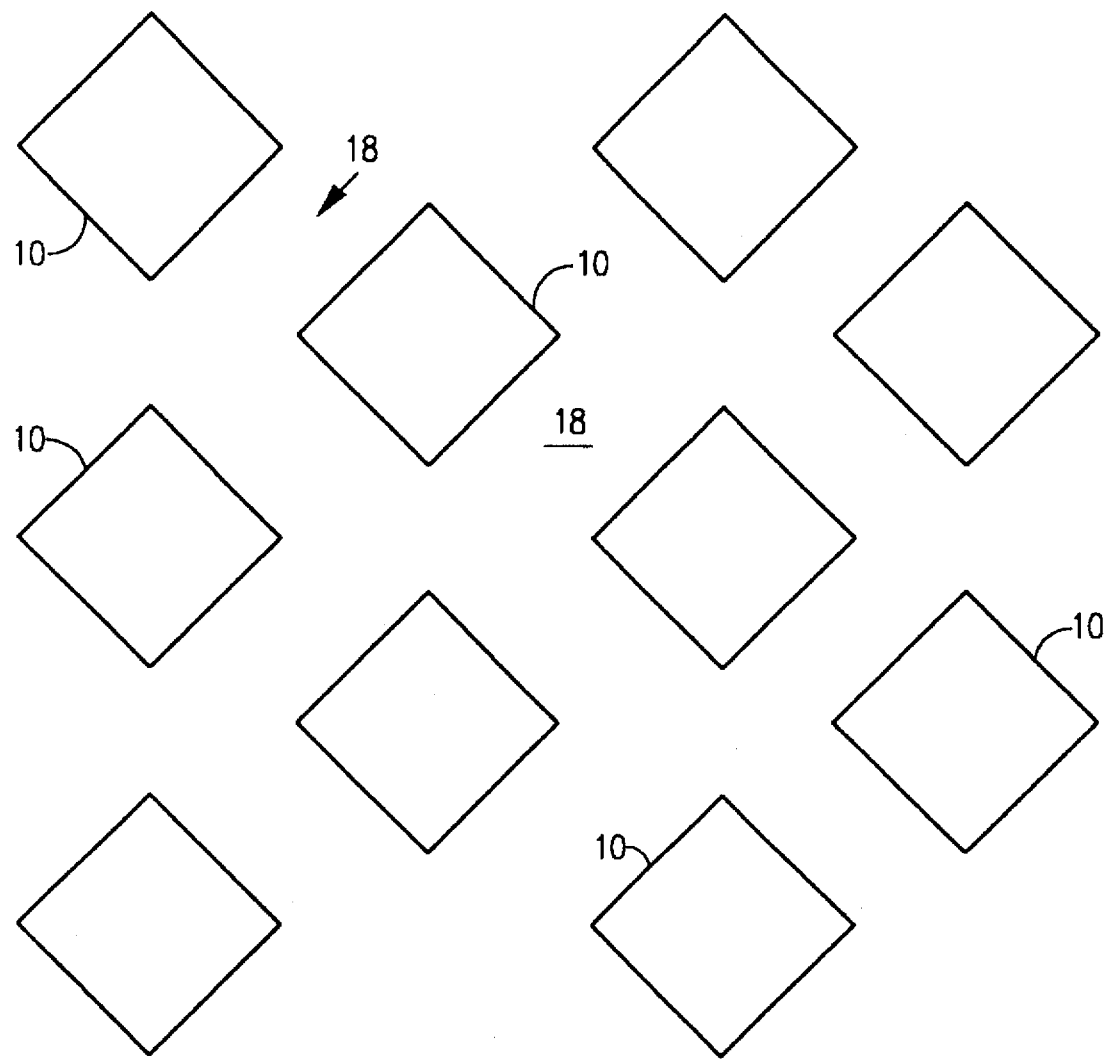
FIG. 4 is a schematic cross section of a structure devoid of particulate material.

FIG. 4 shows a schematic cross section of contact structure having substantially the same spatial relationships to that of FIG. 1, except that the tubes 10 are all empty. This embodiment provides a very effective means to distribute the vapors and liquids in a conventional distillation column.

In a catalytic distillation use, there will be both a liquid and a vapor phase. The liquid, the internal reflux, will contact the tubes, which are most desirably wire mesh and form a film, also the liquids will be absorbed to an extent into the tubes by adsorption onto the catalyst or other filler in the tubes. Although the structure serves as a distillation structure, the presence of the particulate material in the tubes, and the capillary attraction of the liquid thereto will provide a different environment from ordinary distillation structures. In an ordinary distillation structure, one would expect the liquid as well as the gas to follow the path of least resistance through the pathways. However, with portion of the liquid in the column being handled by the tubes, there is less competition for the low resistance open pathways, thus producing a lower back pressure than would be expected.

Figure 3:
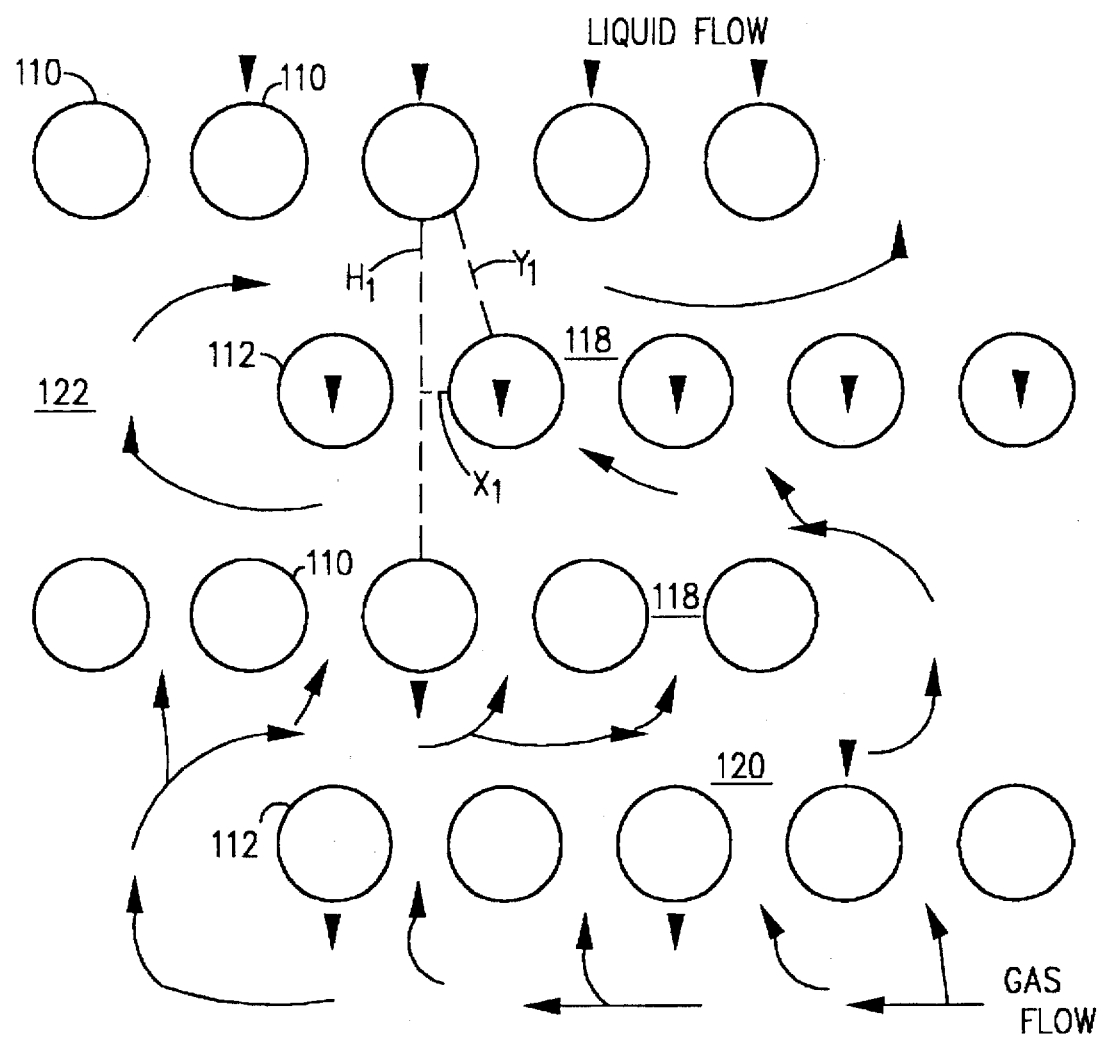
FIG. 3 is a schematic cross section of an alternative embodiment with different spatial relationships from those of FIG. 1.

FIG. 3 offers an arrangement of adjacent columns of tubes 110 and 112, respectively which have a greater vertical displacement between tubes in the same column than the arrangement in FIG. 1 for example. The distances $x_1$ and $y_1$ are not equal and in addition to the tortuous intersticial pathways 118 among the tubes, unrestricted transverse pathways 120 between lateral rows of tubes are provided for gas flow which is shown by the arrows. The removal of one or more tubes at opposite ends of adjacent rows leave open space 122 for the connection of the transverse pathways 120, thus providing at least as tortuous a pathway for gases as the intersticial pathways 118. As before the liquid will tend to flow over and through the tubes and material therein as shown by the carets, ▼.

Figure 2:
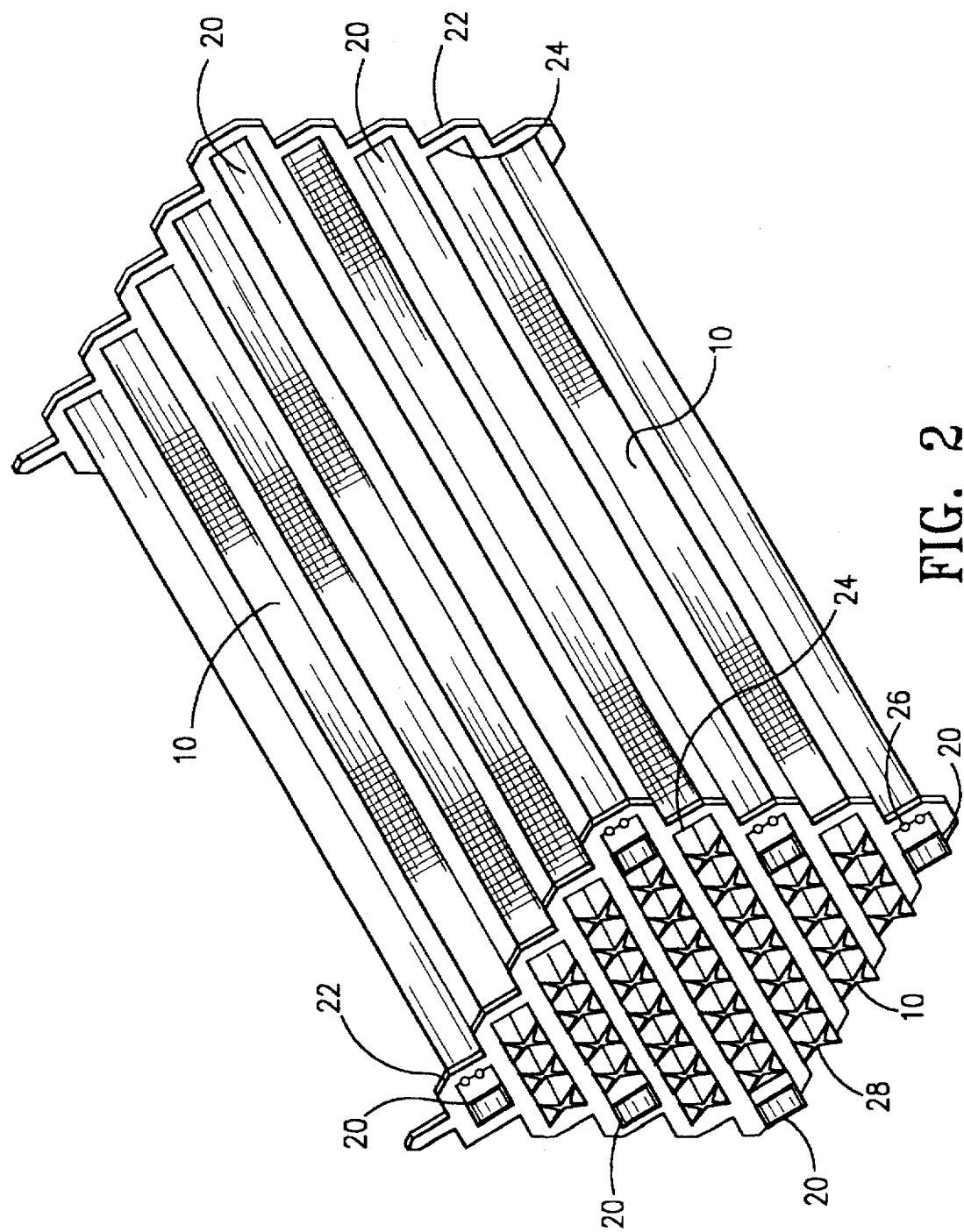
FIG. 2 is an isometric view of a preferred embodiment represented by the spatial relationships of FIG. 1.

FIG. 2 illustrates a structure embodying the spatial relationships of FIG. 1. Rectangular tubes 10 made of wire mesh are positioned into openings 24 in grids 22. The grids 22 are mirror images. They are spaced apart by hollow support rods 20, which are each secured to both grids, for example by welding 26. Other means of securing the grids together include the use of threaded rods and nuts or bolts and nuts (not shown). The resulting structure is rigid and capable of supporting at least one other structure of the present invention, and preferably loads of 100 to 200 pounds. The tubes 10 are normally of approximately the same size and configuration as the openings 24, so that the tubes are held fast and bind in the openings when the two end grids are secured together by the rods 20.

Under normal circumstances each tube 10 will contain a catalytic material 30 in particulate form. The ends of each tube 10 containing particulate catalytic material will be sealed, for example by crimping 28 or with inserted end caps (not shown) or welding.

In the catalytic structure depicted in FIG. 2, some of the tubes shown may be void of any particulate material and/or contain inert particulate material. The void packings are less dense and provide excellent distillation characteristics with a great deal of open space and surfaces.

The inert elements are the packings filled with inert particulate material that may be the same size, smaller or larger than the catalytic particulate material. The inert elements allow for all of the same hydraulic characteristics of the catalytic elements but reduce the catalytic reactions, which in catalytic distillation also designated reactive distillation (U.S. Pat. No. 5,019,669) is frequently a reversible reaction. Hence, by diluting the reactive elements but maintaining the distillation elements a higher degree of the separation aspect of the catalytic distillation is obtainable. In other words by dispersing the inert elements between the catalytic elements in a given structure the fractional separation is emphasized, while in the system as a whole comprising a column with a plurality of the catalytic structures the force of the reaction is maintained.

The dilution of the volume of catalyst present in any given column may be insignificant given the dynamic nature of catalytic distillation and the improved distillation characteristics described above.

The volume of the catalyst loaded into the wire mesh will depend upon its reaction to swelling. One common acidic ion exchange resin used, Amberlyst 15, swells up to 20–30 percent upon wetting, while another, CT-175, swells only 10 to 15 percent. Crystalline zeolites swell hardly at all upon wetting. Particle size is generally about 0.25 to 1 mm, although particles from 0.15 mm up to about 2 mm may be employed, although it is anticipated that extruded particulate catalysts of from 1/32 to 1/2 inch in diameter, such as any of the alumina or alumina supported catalysts may be used.

The catalytic and non-catalytic elements (tubes) are bound together to form a structure, usually by metal grids or templates at the ends of each grouping of elements, which serve as spacers in the nature of a frame when the grids are rigidly spaced apart by several rods or bars.

It will be appreciated that more than one structure may be placed in the column at various heights as desired. In fact in use it is contemplated that multiple structures are arrayed vertically and laterally in a reaction distillation column. Additionally the structure or structures may be supported in the column in any efficient manner. For instance the structures may be supported and separated by inert distillation packing such as Rashig rings or the like.

Figure 5:
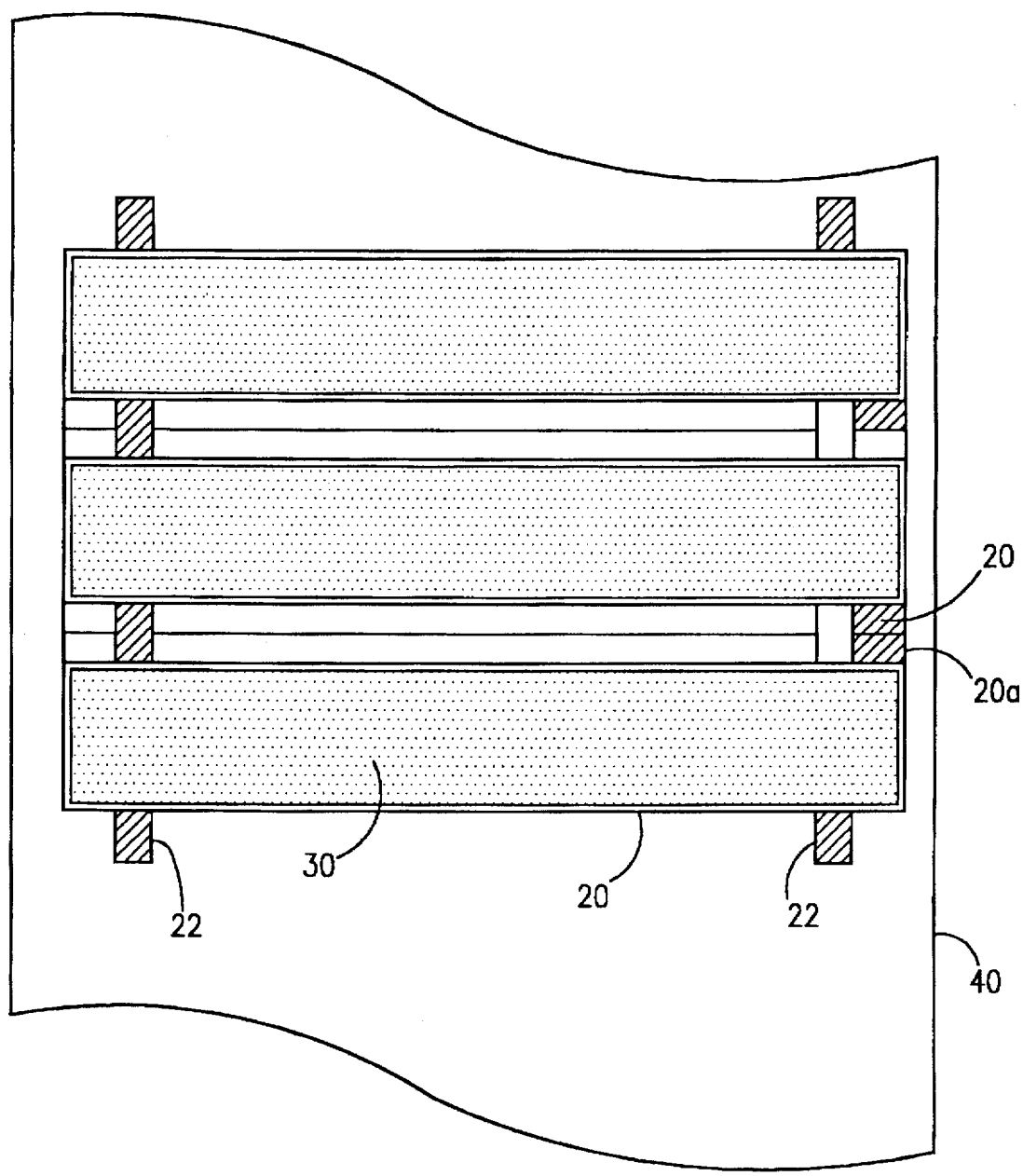
FIG. 5 is schematic cross section of a structure positioned in a distillation column reactor.

FIG. 5 shows a structure positioned in a distillation column reactor 40 in cross section, having tubes 20 with crimped edges 20a. The tubes 20 in front are in cross section while those immediately behind and adjacent are full tubes. The tubes 20 are positioned according to FIG. 1.

EXAMPLES

A structure having the spatial relationships of FIG. 1 was prepared with 5.4 lb of Dow M-31 ion exchange resin (product of Dow Chemical Company) (@ 26% $H_2O$) was loaded into a structure with the following dimensions: $\tau$=0.4" x=0.17" d=0.453" h=0.070" $\epsilon$=0.336 $P_M$=9.9lb/ft$^3$ $S_M$=63.9 ft$^2$/ft$^3$ Q=1.43. The wire screening has a wire diameter of $\delta$(0.009inch) and a mesh size of 50. A total height of 10 ft of the packing with the M-31 catalyst was used in a 100 ft 3" ID column.

This arrangement was used for the etherification isobutene of with methanol to produce methyl tertiary butyl ether. Feeds containing 1.4 to 1.6% isobutene were reacted with methanol at reflux ratios ranging from 0.46 to 0.75 at 100–110 psig to give conversions of isobutene in the range of 83 to 89%.

The invention claimed is:

1. A contact structure comprising a rigid framework and a plurality of substantially horizontal fluid permeable tubes mounted to said grids to form a plurality of fluid pathways among said tubes according to the geometry of the system of FIG. 1 having the following relationships:

$$d = \frac{\tau}{\sqrt{2}} + x \quad \text{1)}$$

$$\epsilon = \frac{(x - 2\delta)}{d} \quad \text{2)}$$

$$T_L = \frac{L}{(\sqrt{2}\ \tau + 2h)} \quad \text{3)}$$

$$P_D = \frac{D - (x + \sqrt{2}\ \tau)}{d} + 1 \quad \text{4)}$$

$$P_M = \frac{T_L P_D \tau^2}{DL} P_b \quad \text{5)}$$

$$L_{MIN} = \frac{\sqrt{(d - 2x)^2 + \left(\frac{\tau}{\sqrt{2}} + h\right)^2}}{\left(\frac{\tau}{\sqrt{2}} + h\right)} \quad \text{6)}$$

$$L_{MAX} = \frac{2h + \sqrt{d^2 + \left(\frac{1}{\sqrt{2}} - h\right)^2}}{\left(\frac{1}{\sqrt{2}} + h\right)} \quad \text{7)}$$

$$Q = \frac{L_{MAX} + L_{MIN}}{2} \quad \text{8)}$$

$$S_M = 2\ T_L P_D \frac{(\tau + h)}{LD} \quad \text{9)}$$

where h=intra tube spacing parameter;

d=inter plate spacing distance (center to center);

x=the distance between the nearest point of a laterally adjacent tube and the central vertical axis of the column of tubes;

y=the distance between the laterally adjacent tubes;

$\tau$=tube size;

$\epsilon$=open void for flow at smallest constriction in packing;

$T_L$=the number of tubes per plate in a packing bundle of height L;

$P_D$=the number of plates in a packing bundle of width D;

$P_M$=catalyst density of packing;

$P_b$=catalyst bulk density;

$L_{MIN}$=minimum vapor path length per unit packing height;

$L_{MAX}$=maximum vapor path length per unit packing height;

Q=tortuosity factor;

L=height of packing bundle;

D=width of packing bundle;

$S_M$=area of screening required per unit volume of packing;

$\delta$=wire diameter.

2. The contact structure according to claim 1 wherein at least a portion of said fluid permeable tubes contain a particulate catalytic material.

3. The contact structure according to claim 2 wherein said fluid permeable tubes comprise wire mesh.

4. The contact structure according to claim 3 wherein a portion of said wire mesh tubes have inert particulate matter disposed therein.

5. The contact structure according to claim 3 wherein the grids are substantially perpendicular to the rigid members and wire mesh tubes and preferably the patterns on the grids are the same.

6. The contact structure according to claim 5 wherein each grid has a pattern of openings for insertion of wire mesh tubes.

7. The contact structure according to claim 6 wherein the pattern on the grids is a regular array of openings.

8. The contact structure according to claim 6 wherein the pattern on the grids is substantially the same.

9. The contact structure according to claim 3 wherein the structure comprises at least two wire mesh tubes arrayed in a substantially parallel, adjacent and vertically aligned row and at least one offset wire mesh tube disposed adjacent to and spaced from said vertically aligned wire mesh tubes.

10. The contact structure according to claim 9 wherein the vertically aligned tubes of the columns are disposed at a distance sufficient to allow the offset wire mesh tube to overlap the vertically aligned wire mesh tubes without contacting said vertically aligned wire mesh tubes to thereby form a tortuous fluid pathway.

11. The contact structure according to claim 10 wherein a portion of said wire mesh tubes have inert particulate matter disposed therein.

12. The contact structure according to claim 1 wherein said fluid permeable tubes comprise wire mesh.

13. The contact structure according to claim 12 wherein a portion of said wire mesh tubes have inert particulate matter disposed therein.

14. The contact structure according to claim 12 wherein the grids are substantially perpendicular to the rigid members and wire mesh tubes and the patterns on the grids are the same.

15. The contact structure according to claim 14 wherein each grid has a pattern of openings for insertion of wire mesh tubes.

16. The contact structure according to claim 15 wherein the pattern on the grids is a regular array of openings.

17. The contact structure according to claim 15 wherein the pattern on the grids is substantially the same.

18. The contact structure according to claim 12 wherein the structure comprises at least two wire mesh tubes arrayed in a substantially parallel, adjacent and vertically aligned row and at least one offset wire mesh tube disposed adjacent to and spaced from said vertically aligned wire mesh tubes.

19. The contact structure according to claim 18 wherein the vertically aligned tubes of the columns are disposed at a distance sufficient to allow the offset wire mesh tube to overlap the vertically aligned wire mesh tubes without contacting said vertically aligned wire mesh tubes to thereby form a tortuous fluid pathway.

20. A contact structure comprising a rigid framework and a plurality of substantially horizontal fluid permeable tubes mounted to said grids to form a plurality of fluid pathways among said tubes according to the geometry of the system of FIG. 1, where x=y having the following relationships:

$$h = (\sqrt{2} - 1)x \quad \text{1)}$$

$$d = \frac{\tau}{\sqrt{2}} + x \quad \text{2)}$$

$$\epsilon = \frac{(x - 2\delta)}{d} \quad \text{3)}$$

$$T_L = \frac{L}{(\sqrt{2}\,\tau + 2h)} \quad \text{4)}$$

$$P_D = \frac{D - (x + \sqrt{2}\,\tau)}{d} + 1 \quad \text{5)}$$

$$P_M = \frac{T_L P_D \tau^2}{DL} P_b \quad \text{6)}$$

$$L_{MIN} = \frac{\sqrt{(d - 2x)^2 + \left(\frac{\tau}{\sqrt{2}} + h\right)^2}}{\left(\frac{\tau}{\sqrt{2}} + h\right)} \quad \text{7)}$$

$$L_{MAX} = \frac{2h + \sqrt{d^2 + \left(\frac{1}{\sqrt{2}} - h\right)^2}}{\left(\frac{1}{\sqrt{2}} + h\right)} \quad \text{8)}$$

$$Q = \frac{L_{MAX} + L_{MIN}}{2} \quad \text{9)}$$

$$S_M = 2\,T_L P_D \frac{(\tau + h)}{LD} \quad \text{10)}$$

where h=intra tube spacing parameter;

d=inter plate spacing distance (center to center);

x=minimum inter plate spacing;

τ=tube size;

ε=open void for flow at smallest constriction in packing;

$T_L$=the number of tubes per plate in a packing bundle of height L;

$P_D$=the number of plates in a packing bundle of width D;

$P_M$=catalyst density of packing;

$P_b$=catalyst bulk density;

$L_{MIN}$=minimum vapor path length per unit packing height;

$L_{MAX}$=maximum vapor path length per unit packing height;

Q=tortuosity factor;

L=height of packing bundle;

D=width of packing bundle;

$S_M$=area of screening required per unit volume of packing;

δ=wire diameter.

21. A distillation column reactor for concurrently carrying out reactions and separating the products from the reactants, comprising:

(a) a vertically disposed vessel;

(b) a catalytic distillation structure disposed therein, comprising:

a rigid framework and a plurality of substantially horizontal fluid permeable tubes mounted to said grids to form a plurality of fluid pathways among said tubes according to the geometry of the system of FIG. 1 having the following relationships:

$$d = \frac{\tau}{\sqrt{2}} + x \quad \text{1)}$$

$$\epsilon = \frac{(x - 2\delta)}{d} \quad \text{2)}$$

$$T_L = \frac{L}{(\sqrt{2}\,\tau + 2h)} \quad \text{3)}$$

$$P_D = \frac{D - (x + \sqrt{2}\,\tau)}{d} + 1 \quad \text{4)}$$

$$P_M = \frac{T_L P_D \tau^2}{DL} P_b \quad \text{5)}$$

$$L_{MIN} = \frac{\sqrt{(d-2x)^2 + \left(\frac{\tau}{\sqrt{2}} + h\right)^2}}{\left(\frac{\tau}{\sqrt{2}} + h\right)} \qquad 6)$$

$$L_{MAX} = \frac{2h + \sqrt{d^2 + \left(\frac{1}{\sqrt{2}} - h\right)^2}}{\left(\frac{1}{\sqrt{2}} + h\right)} \qquad 7)$$

$$Q = \frac{L_{MAX} + L_{MIN}}{2} \qquad 8)$$

$$S_M = 2\, T_L P_D \frac{(\tau + h)}{LD} \qquad 9)$$

where
- h=intra tube spacing parameter;
- d=inter plate spacing distance (center to center);
- x=the distance between the nearest point of a laterally adjacent tube and the central vertical axis of the column of tubes;
- y=the distance between the laterally adjacent tubes;
- τ=tube size;
- ε=open void for flow at smallest constriction in packing;
- $T_L$=the number of tubes per plate in a packing bundle of height L;
- $P_D$=the number of plates in a packing bundle of width D;
- $P_M$=catalyst density of packing;
- $P_b$=catalyst bulk density;
- $L_{MIN}$=minimum vapor path length per unit packing height;
- $L_{MAX}$=maximum vapor path length per unit packing height;
- Q=tortuosity factor;
- L=height of packing bundle;
- D=width of packing bundle;
- $S_M$=area of screening required per unit volume of packing;
- δ=wire diameter, at least a portion of said fluid permeable tubes containing a particulate catalytic material.

* * * * *